(12) United States Patent
Fraser

(10) Patent No.: US 6,883,268 B2
(45) Date of Patent: Apr. 26, 2005

(54) BUCKET TACKLE SYSTEM

(76) Inventor: Richard T. Fraser, 13852 W. Merth Dr., Homer Glen, IL (US) 60441

( * ) Notice: Subject to any disclaimer, the term of this patent is extended or adjusted under 35 U.S.C. 154(b) by 0 days.

(21) Appl. No.: 10/800,210

(22) Filed: Mar. 15, 2004

(65) Prior Publication Data

US 2004/0237378 A1 Dec. 2, 2004

Related U.S. Application Data

(60) Provisional application No. 60/474,522, filed on May 31, 2003.

(51) Int. Cl.[7] .......................... A01K 97/08; A01K 97/10
(52) U.S. Cl. .................... 43/54.1; 43/21.2; 206/315.11; 206/372; 248/512
(58) Field of Search ............................... 43/54.1, 21.2; 206/315.11, 15.2, 15.3, 349, 372, 373, 443, 579, 315.3, 315.6; 224/922, 315.6; 211/70.8, 70.6, 60.1, 62, 65; 248/512, 519

(56) References Cited

U.S. PATENT DOCUMENTS

| | | | | |
|---|---|---|---|---|
| 1,849,610 A | * | 3/1932 | Boyce | 206/315.6 |
| 2,545,171 A | * | 3/1951 | Schroeder | 211/60.1 |
| 2,595,746 A | * | 5/1952 | Zinn | 206/315.11 |
| 2,604,211 A | * | 7/1952 | Steine | 248/512 |
| 2,860,679 A | * | 11/1958 | Kouke | 206/315.6 |
| 2,881,947 A | * | 4/1959 | Hancock | 211/60.1 |
| 2,988,205 A | * | 6/1961 | Barlow | 206/303 |
| 3,164,185 A | * | 1/1965 | Ingoldt | 206/315.6 |
| 3,291,296 A | * | 12/1966 | Lemkelde | 211/60.1 |
| 3,298,532 A | * | 1/1967 | Wilcke | 211/70.6 |
| 3,350,810 A | * | 11/1967 | Warner et al. | 206/315.11 |
| 3,431,041 A | * | 3/1969 | Bernat | 211/60.1 |
| 3,456,806 A | * | 7/1969 | Borston | 211/60.1 |
| 3,484,359 A | * | 12/1969 | Brown et al. | 248/512 |
| 3,603,019 A | * | 9/1971 | Smeltzer | 43/21.2 |
| 3,643,812 A | * | 2/1972 | Mander et al. | 206/443 |
| 3,661,270 A | * | 5/1972 | Lucci et al. | 211/62 |
| 3,667,708 A | * | 6/1972 | Smeltzer | 248/512 |
| 3,751,845 A | * | 8/1973 | van Leeuwen | 43/56 |
| 3,980,115 A | * | 9/1976 | Longo | 206/315.6 |
| 3,987,574 A | * | 10/1976 | Pennino | 43/54.1 |

(Continued)

FOREIGN PATENT DOCUMENTS

| | | | |
|---|---|---|---|
| DE | 3626574 A1 | * | 2/1988 |
| JP | 6-303886 A1 | * | 11/1994 |
| JP | 2000-270742 A1 | * | 10/2000 |

Primary Examiner—Darren W. Ark
(74) Attorney, Agent, or Firm—Davis Chin

(57) ABSTRACT

A bucket tackle system for organizing, transporting and storing of fishing rods and reels is provided which includes a bucket, a fishing rod and reel holder insert assembly, and a cover. The bucket has a closed bottom base and a cylindrical side wall extending upwardly from the closed bottom base and terminating in an open end. The holder insert assembly includes a flat disc portion, a plurality of end cap members fixedly secured to the disc portion, and a plurality of hollow tubular members having a first end and a second end. The first end of each of the plurality of tubular members is fixedly secured to a corresponding one of the plurality of end cap members so as to be vertically extending therefrom. The second end of each of the plurality of tubular members is formed with opposed first and second slots adapted for holding handle portions of the fishing rods and reels. The cover has a plurality of openings which are aligned with the first ends of the plurality of tubular members so that the cover is slidable down over the tubular members and is engageable with the open end of the bucket. As a result, the handle portions of the fishing rods and reels are insertable into corresponding ones of the plurality of tubular members and are supported and maintained in a vertical position adjacent to each other, thereby preventing them from being damaged and/or destroyed.

8 Claims, 4 Drawing Sheets

U.S. PATENT DOCUMENTS

| | | | | |
|---|---|---|---|---|
| 4,106,811 A | * | 8/1978 | Hernandez | 43/54.1 |
| 4,157,804 A | * | 6/1979 | Byford | 248/512 |
| 4,304,278 A | * | 12/1981 | Ruhlandt | 206/315.6 |
| 4,311,262 A | * | 1/1982 | Morin | 43/54.1 |
| 4,332,283 A | * | 6/1982 | Rader | 206/315.6 |
| 4,487,316 A | * | 12/1984 | Calhoun et al. | 206/443 |
| 4,756,412 A | * | 7/1988 | Graves et al. | 43/54.1 |
| 4,827,658 A | * | 5/1989 | Wolniak | 43/54.1 |
| 4,845,881 A | * | 7/1989 | Ward | 43/21.2 |
| 4,871,099 A | * | 10/1989 | Bogar, Jr. | 43/21.2 |
| 4,944,396 A | * | 7/1990 | Larkin | 206/315.6 |
| 5,029,699 A | * | 7/1991 | Insley et al. | 206/443 |
| 5,060,796 A | * | 10/1991 | Brooks, III. | 206/315.6 |
| 5,092,463 A | * | 3/1992 | Dees | 211/70.6 |
| 5,094,422 A | * | 3/1992 | Tiffany | 248/519 |
| 5,125,183 A | * | 6/1992 | Tisdell | 43/54.1 |
| 5,131,179 A | * | 7/1992 | McEwen | 43/21.2 |
| 5,135,107 A | * | 8/1992 | Ingraham | 206/315.6 |
| 5,188,243 A | * | 2/1993 | Ruiz | 206/315.3 |
| 5,261,561 A | * | 11/1993 | Hodges, Jr. | 43/54.1 |
| 5,271,520 A | * | 12/1993 | McAfee | 206/315.11 |
| 5,303,500 A | * | 4/1994 | Luukonen | 43/54.1 |
| 5,305,542 A | * | 4/1994 | Phelps | 43/21.2 |
| 5,319,877 A | * | 6/1994 | Hagan | 43/54.1 |
| 5,337,892 A | * | 8/1994 | Zaffina | 43/54.1 |
| 5,341,927 A | * | 8/1994 | Coyner | 206/315.3 |
| 5,390,944 A | * | 2/1995 | Sherwin | 211/70.6 |
| 5,573,122 A | * | 11/1996 | Williams | 206/315.6 |
| 5,634,291 A | * | 6/1997 | Pham | 43/57 |
| 5,659,995 A | * | 8/1997 | Hoffman | 43/54.1 |
| 5,715,952 A | * | 2/1998 | Chichetti | 211/70.8 |
| 5,775,513 A | * | 7/1998 | Anthony | 206/315.3 |
| 5,792,426 A | * | 8/1998 | Portmann et al. | 206/443 |
| 5,823,364 A | * | 10/1998 | Mucciacciaro | 211/70.6 |
| 5,829,589 A | * | 11/1998 | Nguyen et al. | 206/443 |
| 5,836,446 A | * | 11/1998 | Varnom | 211/70.6 |
| 5,938,049 A | * | 8/1999 | Susholz | 211/62 |
| 5,967,315 A | * | 10/1999 | Langtry, II | 43/54.1 |
| 5,971,333 A | * | 10/1999 | Fiedor | 211/70.6 |
| 6,073,387 A | * | 6/2000 | Torkilsen et al. | 43/54.1 |
| 6,109,446 A | * | 8/2000 | Foote | 206/372 |
| 6,209,721 B1 | * | 4/2001 | Sharpe et al. | 206/315.6 |
| 6,253,484 B1 | * | 7/2001 | O'Connor | 43/21.2 |
| 6,254,055 B1 | * | 7/2001 | Lamberson, Jr. | 43/21.2 |
| 6,286,678 B1 | * | 9/2001 | Petrek | 206/443 |
| 6,345,722 B1 | * | 2/2002 | Wingate | 248/519 |
| 6,364,150 B1 | * | 4/2002 | Persinger | 43/54.1 |
| 6,497,236 B1 | * | 12/2002 | Yates et al. | 211/65 |
| 6,530,170 B1 | * | 3/2003 | Sweeney | 43/21.2 |
| 6,530,487 B1 | * | 3/2003 | Berry | 211/70.6 |
| 6,658,786 B1 | * | 12/2003 | Williams | 43/54.1 |
| 6,679,377 B1 | * | 1/2004 | Maddox | 43/54.1 |
| 6,729,066 B1 | * | 5/2004 | Howley | 43/54.1 |
| 6,755,311 B1 | * | 6/2004 | Berry | 248/512 |
| 6,774,792 B1 | * | 8/2004 | Williams | 206/315.6 |
| 2004/0035808 A1 | * | 2/2004 | Berry | 211/70.6 |

* cited by examiner

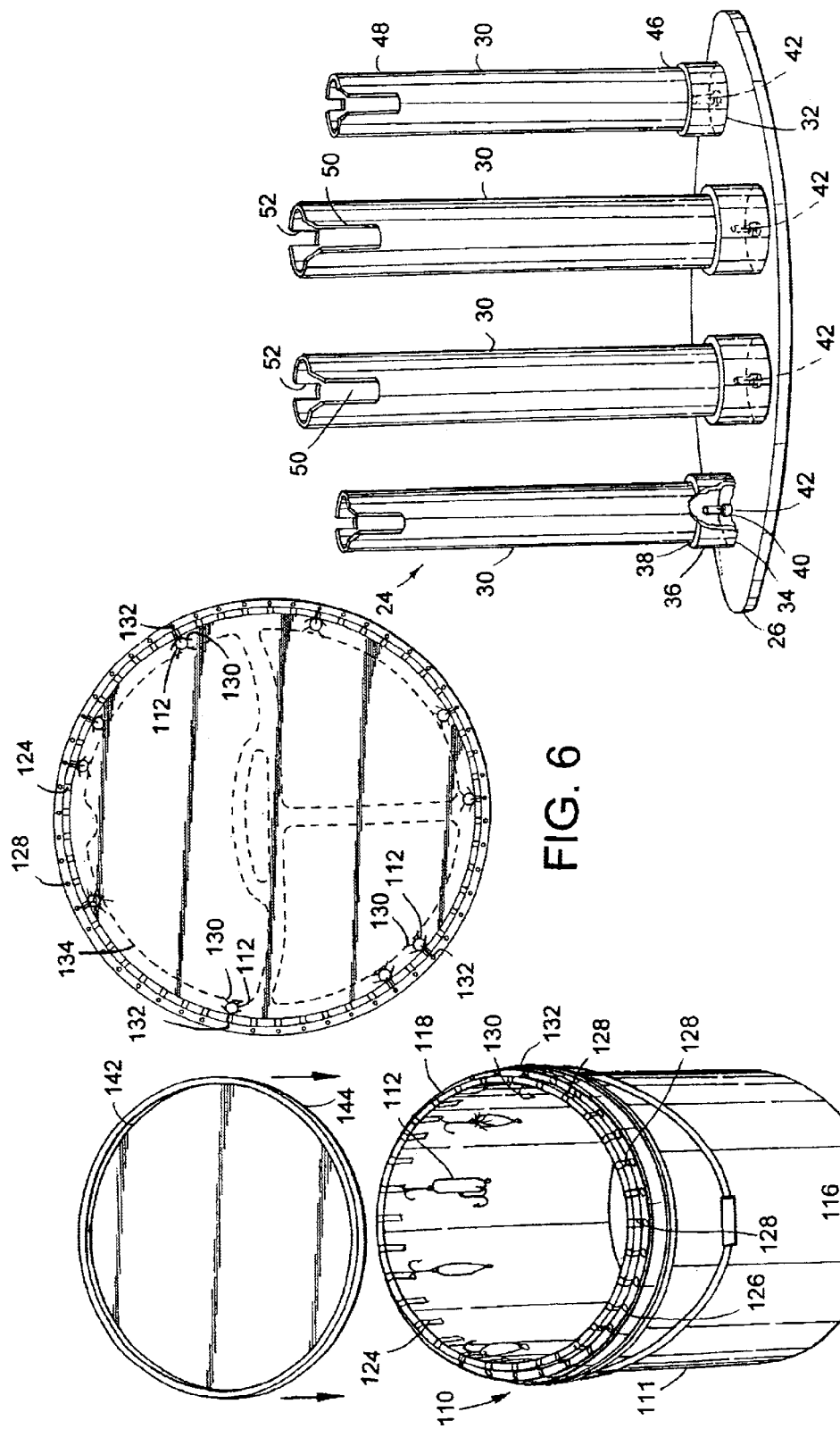

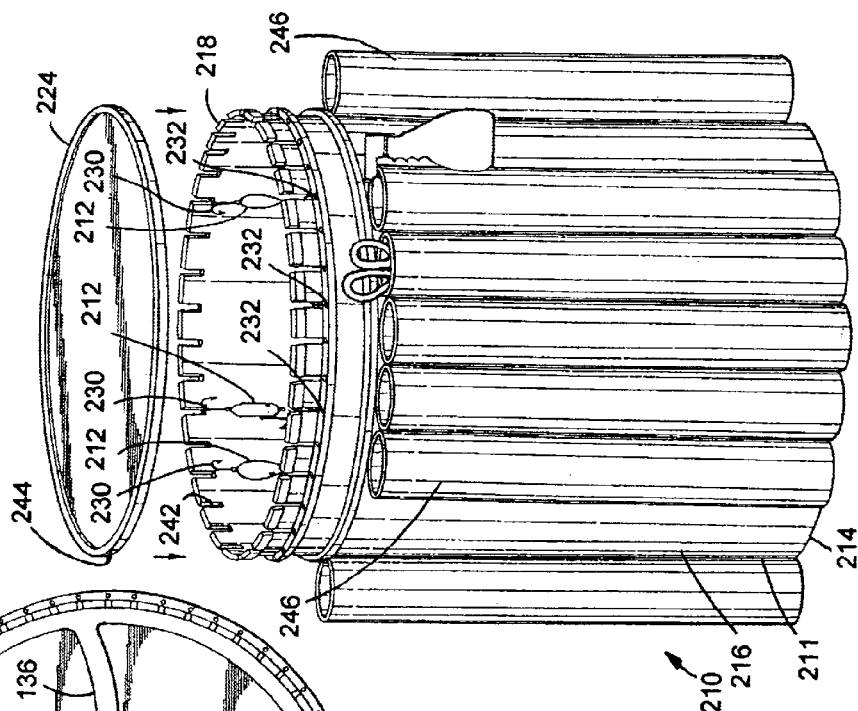
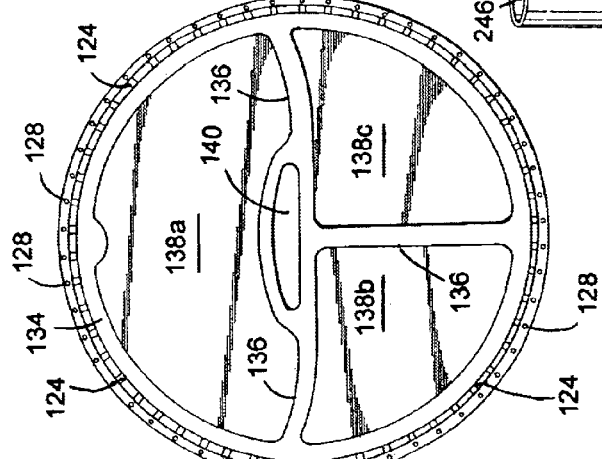
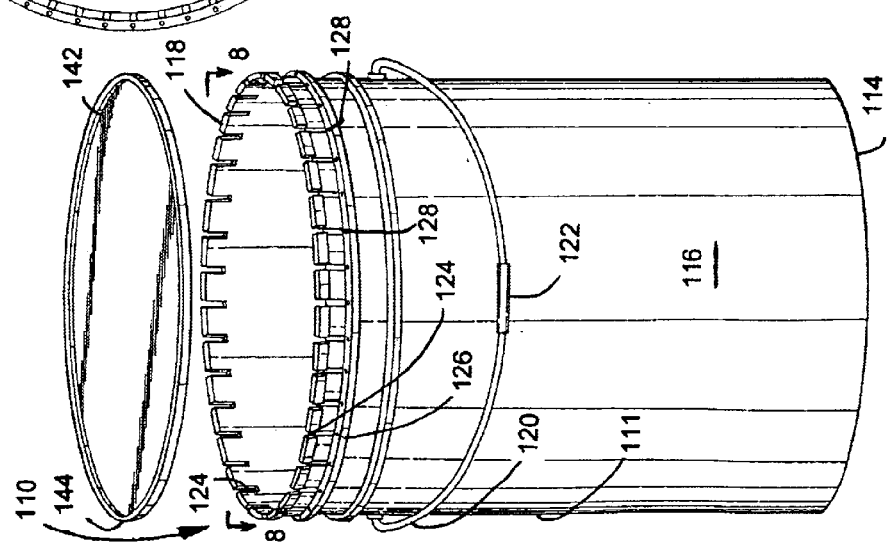
FIG. 7
FIG. 8
FIG. 9

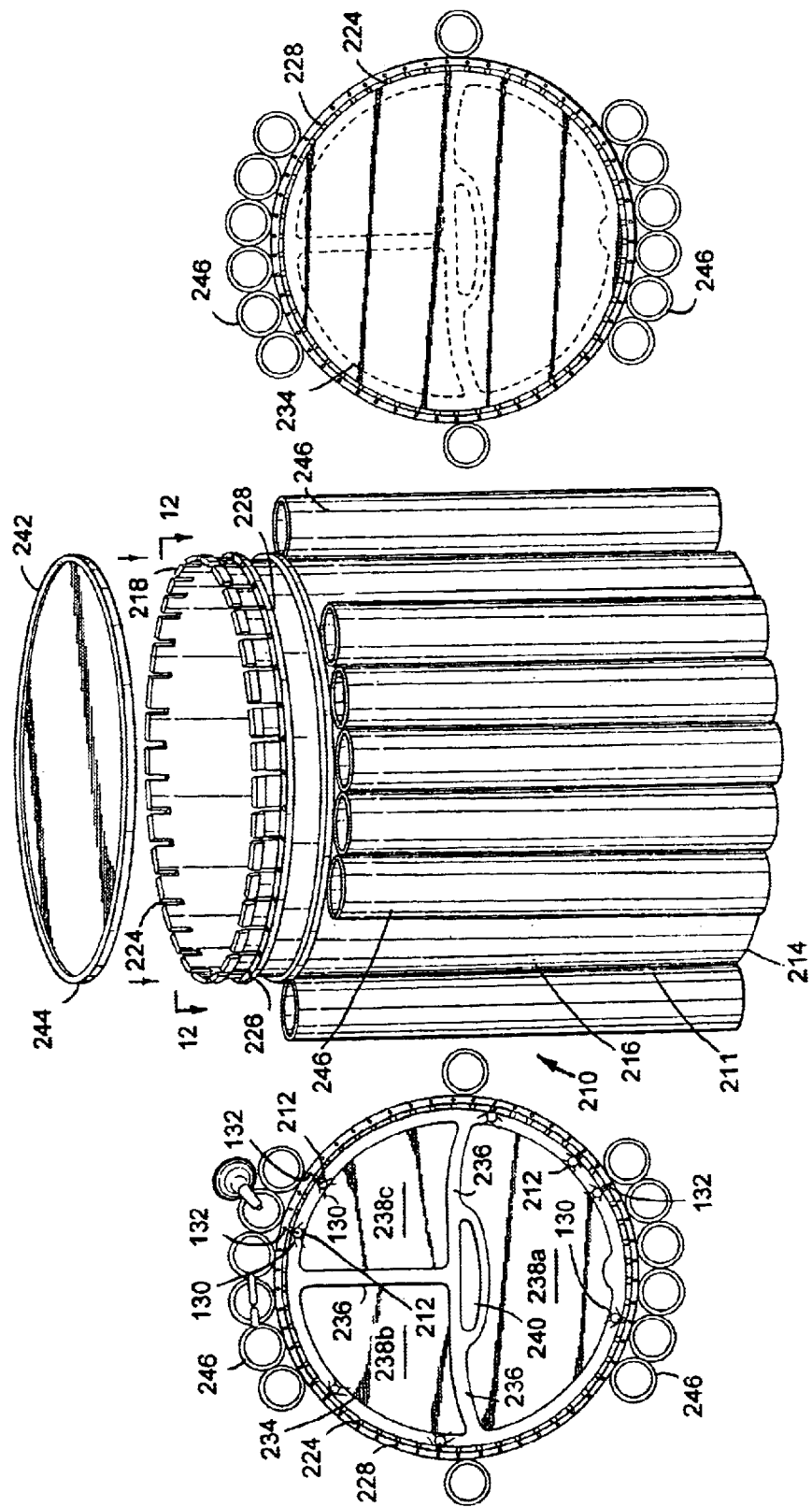

US 6,883,268 B2

BUCKET TACKLE SYSTEM

CROSS-REFERENCE TO RELATED APPLICATIONS

This application is a continuation-in-part of provisional application Ser. No. 60/474,522 filed on May 31, 2003.

BACKGROUND OF THE INVENTION

1. Field of the Invention

This invention relates generally to fishing rod and tackle carriers and more particularly, the present invention relates to an improved bucket tackle system for organizing, transporting, and storing of fishing rods and reels, lures, and fishing equipment so as to allow for easy access and to prevent them from being damaged and/or destroyed.

2. Description of the Prior Art

As is generally well-known, the activity of sport or recreational fishing with rods and reels requires the use of a considerable amount of equipment. This is especially true where the line, bait, and hook are cast from the side of a boat into a lake or stream. The fishing site is usually located some distance from the dock or shore and thus all of the fisherman's gear must be transported from the dock and loaded onto the boat for traveling to the remote fishing site. During this transporting of the fishing rods and reels, they are sometimes laid down and/or fall onto the deck surface of the boat. As a result, these fishing rods and reels, which are relatively quite expensive, may become stepped on and broken or damaged and/or destroyed by the fishermen.

In addition, tackle boxes having multiple compartments have been used by fishermen to sort and store artificial bait and lures, hooks, sinkers, quills, lines and other various fishing implements used in fishing. However, often these fishing implements are tossed around and become mixed up or tangled together during their transportation so as to be not readily accessible during the time of fishing. Further, it is sometimes difficult to remember which one of the multiple compartments in the tackle box had been used for storing a specific lure or the like.

Accordingly, it would be desirable to provide an improved bucket tackle system for organizing, transporting and storing of fishing rods and reels and other fishing equipment which is relatively simple and inexpensive in design, construction, and operation. It would also be expedient that the bucket tackle system be easily accessible so that the desired fishing implement can be quickly located, but yet prevent them from being damaged and/or destroyed.

A prior art search directed to the subject matter of this application in the U.S. Patent and Trademark Office revealed the following Letters Patent and application:

| | |
|---|---|
| 3,751,845 | 5,337,892 |
| 4,845,881 | 5,634,291 |
| 5,125,183 | 5,659,995 |
| 5,261,561 | 6,253,484 |
| 5,303,500 | 6,254,055 |
| 5,319,877 | 6,364,150 |

In U.S. Pat. No. 5,303,500 to Luukonen issued on Apr. 19, 1994, there is disclosed a portable ice fishing device for use by ice fisherman which includes a bucket with a handle, a first tray, a second tray, a third tray, a cover and an apron. The trays contain a plurality of dividers so as to separate various types of fishing gear. The apron is formed of a body having an upper portion, a lower portion, a ledge, a pocket, and a strap. During use, a plurality of ice fishing rods may be attached to the apron. The handles of the fishing rods are preferably positioned within the pocket for resting engagement upon the base. The central portion of the fishing rods is then positioned within one of the plurality of grooves during transportation of the ice fishing device.

In U.S. Pat. No. 6,364,150 to Persinger issued on Apr. 2, 2002, there is taught an ice fishing bucket for organizing and transporting ice fishing rods and tackle which includes a bucket member and a removable lid secured to the lip of the bucket member. The lid has a large hole cut in its surface and a foam ring is fitted around the inner periphery of the hole. Slits are cut radially around the inner circumference of the foam ring for securing fishing rods. A foam disk is fitted into the bottom of the bucket member against a bottom wall. The foam disk has holes for receiving the handles ends of the ice fishing rods. To organize the fishing rods, the handle of a rod is placed in one of the holes in the foam disk and the rod is then pushed into the corresponding slit in the foam ring on the bucket lid.

In U.S. Pat. No. 6,254,055 to Lamberson, Jr. issued on Jul. 3, 2001, there is taught a fishing rod holder insert for holding fishing rods in a five-gallon bucket. The fishing rod insert includes a spaced apart top and bottom plates with a plurality of elongated rods extending between the top and bottom plates for connecting them together. The top and bottom plates each have a plurality of spaced apart cut-outs along the outer perimeter of the respective plates. In use, the insert is disposed in the bucket and each of the cut-outs are designed to receive a tip-up or jig rod therein for holding the same in a relatively upright position in the bucket.

U.S. Pat. No. 6,253,484 issued on Jul. 3, 2001 to O'Connor discloses a fishing rod holder which includes a first leg in direct contact with an inner surface of a bucket and a second leg in direct contact with an outer surface of the bucket. An arm extends from an upper end of the second leg, and a bridge spans a top end of the first leg and the upper end of the second leg. In operation, the first leg and the second leg are slid over the sidewall of the bucket. A fishing pole is placed in the channel defined by the inner sides of the arm and the canted side of the bridge.

The remaining patents, listed above but not specifically discussed, are deemed to be only of general interest and show the state of the art in fishing rod and tackle carriers for organizing, transporting and storing of fishing rods and reels and other fishing equipment.

None of the prior art discussed above disclosed a bucket tackle system like that of the present invention which includes a bucket, a fishing rod and reel insert assembly disposed inside of the bucket, and a cover secured to the open end of the bucket for organizing, transporting and storing fishing rods and reels so as to prevent them from being damaged and/or destroyed.

SUMMARY OF THE INVENTION

Accordingly, it is a general object of the present invention to provide an improved buckle tackle system for organizing, transporting and storing of fishing rods and reels and other fishing equipment which is relatively simple and inexpensive in design, construction and operation.

It is an object of the present invention to provide a buckle tackle system for organizing, transporting and storing of fishing rods and reels and other fishing equipment on an efficient and cost effective basis.

It is another object of the present invention to provide a buckle tackle system for organizing, transporting and storing of artificial fishing lures which is easily accessible so that the desired fishing implement can be quickly located, but yet prevent them from being damaged and/or destroyed.

It is still another object of the present invention to provide a buckle tackle system for organizing, transporting and storing of fishing rods and reels and other fishing equipment which includes a bucket, a fishing rod and reel insert assembly disposed inside of the bucket, and a cover secured to the open end of the bucket.

In a preferred embodiment of the present invention, there is provided a bucket tackle system for organizing, transporting and storing of fishing rods and reels. The bucket tackle system includes a bucket, a fishing rod and reel holder insert assembly, and a cover. The bucket has a closed bottom base and a cylindrical side wall extending upwardly from the closed bottom base and terminating in an open end. The fishing rod and reel holder insert assembly includes a flat disc portion, a plurality of end cap members fixedly secured to the disc portion, and a plurality of hollow tubular members having a first end and a second end.

The first end of each of the plurality of tubular members is fixedly secured to a corresponding one of the plurality of end cap members so as to be vertically extending therefrom. The second end of each of the plurality of tubular members is formed with opposed first and second slots adapted for holding handle portions of the fishing rods and reels. The cover has a plurality of openings which are aligned with the first ends of the plurality of tubular members so that the cover is slidable down over the tubular members and is engageable with the open end of the bucket. The handle portions of the fishing rods and reels are insertable into corresponding ones of the plurality of tubular members and are supported and maintained in a vertical position adjacent to each other, thereby preventing them from becoming damaged and/or destroyed.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 4 is an enlarged view of the holder base assembly of the bucket tackle system of FIG. 3 in its assembled condition;

FIG. 5 is a perspective view of a second embodiment of a bucket tackle system of the present invention, illustrating a plurality of artificial fishing lures;

FIG. 6 is a top plan view of the bucket tackle system of FIG. 5;

FIG. 7 is a side elevational view of the bucket tackle system of FIG. 5, but with the artificial fishing lures being removed;

FIG. 8 is a top plan view of the bucket tackle system, taken along the lines 8—8 of FIG. 7;

FIG. 9 is a perspective view of a third embodiment of a bucket tackle system of the present invention, depicting a variety of accessories being carried on the exterior of the bucket;

FIG. 10 is a top plan view of the bucket tackle system of FIG. 9;

FIG. 11 is a side elevational view of the bucket tackle system of FIG. 9, but with the accessories being removed; and FIG. 12 is a top plan view of the bucket tackle system of FIG. 9, taken along the lines 12—12 of FIG. 11.

DESCRIPTION OF THE PREFERRED EMBODIMENTS

Figure 1:
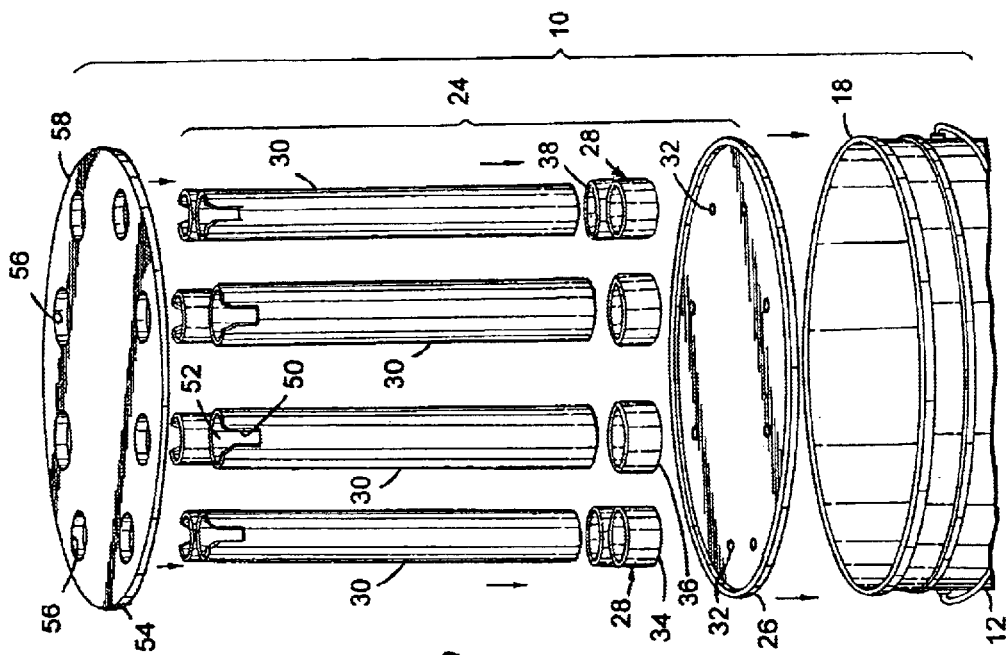
FIG. 1 is a perspective view of a bucket tackle system, constructed in accordance with the principles of the present invention and illustrated in combination with a plurality of fishing rods and reels.

It is to be distinctly understood at the outset that the present invention shown in the drawings and described in detail in conjunction with the preferred embodiments is not intended to serve as a limitation upon the scope or teachings thereof, but is to be considered merely as an exemplification of the principles of the present invention.

Figure 2:
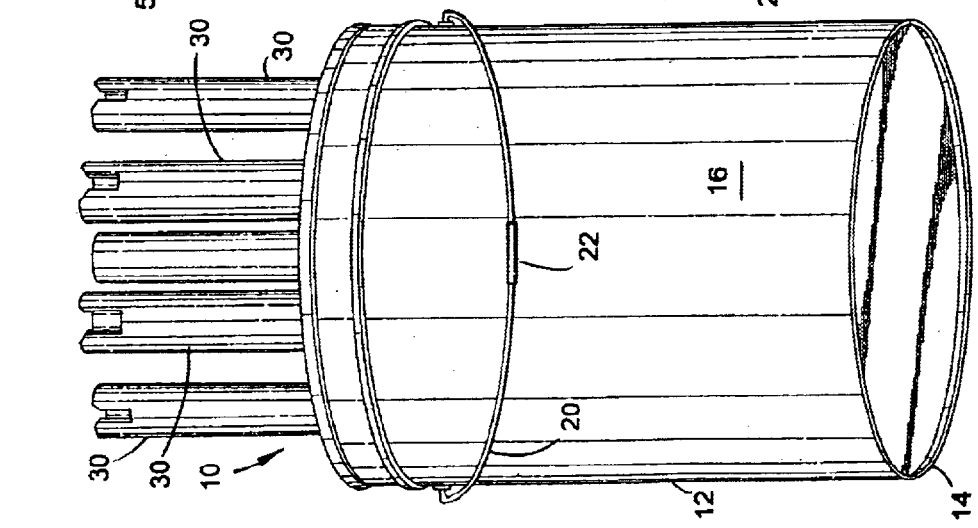
FIG. 2 is a side elevational view of the bucket tackle system of FIG. 1, but with the fishing rods and reels being removed.
Figure 3:
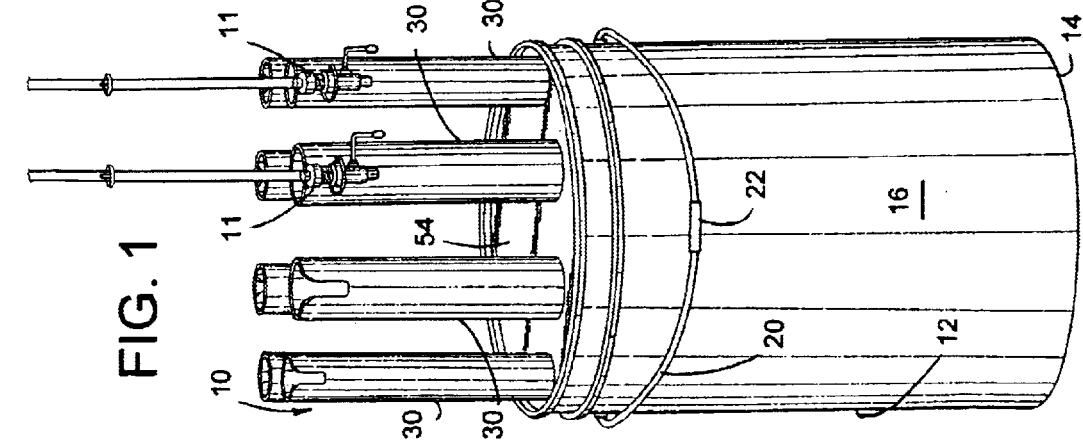
FIG. 3 is an exploded, perspective view of the bucket tackle system of FIG. 1.

Referring now in detail to the drawings, there is illustrated in FIG. 1 a perspective view of a bucket tackle system 10, constructed in accordance with the principles of the present invention and illustrating in combination a plurality of fishing rods and reels 11. FIG. 2 is a side elevational view of the bucket tackle system 10 of FIG. 1, but the fishing rods and reels 11 have been removed. FIG. 3 is an exploded, perspective view of the bucket tackle system 10 of FIG. 1. FIG. 4 is an enlarged view of the holder insert assembly of the bucket tackle system 10 of FIG. 1 in its assembled condition.

The bucket tackle system 10 includes a container or bucket 12 which has a generally cylindrical shape for holding a five-gallon or six-gallon capacity. However, it should be understood that various other cross-sectional configurations, such as square, rectangle, oval, and the like may be used as well. The bucket 12 is formed by a circular planar closed bottom base 14 and a circumferential side wall 16 which extends upwardly from the bottom base 14 and terminates in an open end 18 defining a lip portion. The side wall 16 of the bucket is also preferably provided with a bail 20 which has a handle 22. The ends of the bail 20 are mounted adjacent to the top of the side wall 16 of the bucket 12 so as to allow rotation of the handle 22.

The bucket 12 has preferably a height dimension of approximately eighteen inches and a diameter dimension of about twelve inches. It should be noted that the shape and the dimensions thereof are supplied for illustrative purposes and may be varied considerably provided that the essential features, function, and attributes of the present invention described herein are not sacrificed. The bucket 12 may be formed of any suitable material, such as plastic, wood, fiberglass, metal and the like as desired by a user. Preferably, the bucket is generally molded of a one-piece construction of plastic material having a thickness of about one-eighth of an inch so as to provide sufficient strength and durability, thereby preventing its damage and/or destruction during its transportation and use.

The bucket tackle system 10 includes a fishing rod and reel holder insert assembly 24 which is comprised of a flat circular disc 26, a plurality of substantially cup-shaped end cap members 28, and a plurality of hollow tubular members 30. The flat circular disc 26 may be formed of any suitable material, such as plastic, wood, fiberglass, metal and the like. The flat disc 26 is preferably made of plywood having a thickness of about three-eighth (⅜) of an inch. The diameter of the disc is about ten and one-fourth inches.

Eight equally spaced-apart mounting holes 32 are drilled into the disc 26 about one and one-half inches from its circumference. In other words, the holes 32 are located 45 degrees apart from each other. Each of the end cap members 28 has a bottom wall 34 and a cylindrical side wall 36 extending upwardly from the bottom wall and terminates in an open end 38. The bottom wall 34 is provided a central opening 40 which is alignable with a corresponding one of the holes 32 in the disc 26. Each of the end cap members 28 is fixedly mounted via the corresponding ones of the central openings 40 to the disc 26 by suitable mounting means, such as by welding, nuts and bolts, rivets and the like. In the illustrative embodiment, the eight end cap members 28 are held by rivets 42 to the top surface 44 of the disc 26 so as to be arranged in a circular manner. The end cap members 28 and the tubular members 30 may likewise be formed of any suitable material, such as plastic, wood, fiberglass, metal and the like. The end cap members 28 and the tubular members 30 are preferably made of a polyvinyl chloride (PVC) material. The bottom wall 34 of the end cap member 28 has a diameter of about one and one-half inches and the side wall 26 thereof has a height dimension of about one and one-half inches.

Each of the plurality (eight) tubular members 30 has a length dimension of about twenty inches and a diameter dimension of about one and one-half inches. One end 46 of the tubular members 30 is telescoped to a corresponding one of the end cap members 28 and secured therein by any adhesive means, such as glue and the like. The other end 48 of the tubular member 30 is provided with a pair of first and second opposed slots 50, 52 for receiving and holding therein a corresponding one of the fishing rods and reels 11 (FIG. 1). The first slot 50 consists of a substantially U-shaped cut-out having a width dimension of about one inch and a height dimension of about two and one-fourth inches. The distance across the top of the first slot 50 is approximately one and three-fourth inches. The second slot 52 consist of a U-shaped cut-out having a width dimension of about one inch and a height dimension of about one inch. The first slot 50 allows the rearward butt of the handle of the fishing rods and reels 11 to be inserted into the tubular members 30, and the second slot 52 allows the forward grip of the handles thereof a place to come to rest. In this manner, the plurality of fishing rods and reels 11 are supported and maintained in a vertical position adjacent to each other as shown in FIG. 1, thereby preventing them from being damaged or destroyed.

The bucket tackle system 10 further includes a flat circular cover or lid 54 having a plurality of holes 56 which are aligned vertically with the plurality of tubular members 30 secured in the end cap members 28. The cover is also provided with a downwardly-extending flange 58. When the tubular members are slid through the holes 56 in the cover 54, the flange 58 can then be snapped over the lip portion of the bucket 12 so as to lock the cover in place. The holes 56 in the cover serve to maintain the plurality of tubular members in a vertical relationship to each other so that they do not contactly engage against each other during transportation and use, thereby preventing noise and/or becoming damaged. The cover 54 is preferably formed of a plastic material. The cover has a diameter dimension of slightly larger than ten and one-fourth inches. The holes 56 are equally spaced-apart from each other and have a diameter of about one and one-half inches so as to receive therethrough the corresponding ones of the tubular members 30.

In use, the eight end cap members 28 are initially fixedly secured to the circular disc 26, and the plurality of hollow tubular members 30 with the opposed slots 50, 52 formed therein are then fixedly secured in a vertically extending position to the corresponding end cap members 28 so as to form the fishing rod and reel holder insert assembly 24, as depicted in FIG. 4. Next, the holder insert assembly 24 is positioned inside of the bucket 12 and the cover 54 is placed over the vertically extending tubular members 30 so that the holes 56 thereof are aligned with corresponding ones of the tubular member 30. The cover is slid down over the tubular members and engages with the top lip portion 18 of the bucket 12. The flange 58 of the cover 54 is snapped over the lip portion 18 so as to retain it in place. The handle portions of the plurality of fishing rod and reels 11 are inserted via the opposed slots 50, 52 into the corresponding tubular members.

In order to prevent the bucket 12 holding the plurality of fishing rod and reels 11 from tipping over easily, weights may be added to the inside of the bucket 12 and around the tubular members 30. In the alternative, it will be noted that the end cap members 28 can be fixedly mounted to the inside surface of the bottom base 14 of the bucket 12, such as by welding, rivets and the like. In this fashion, the circular disc 26 of the holder insert assembly 24 can be eliminated.

In FIG. 5, there is shown a perspective view of a second embodiment of a bucket tackle system 110 of the present invention for holding and storing of a plurality of large artificial fishing lures 112 used especially for Muskier and Northern fishing. FIG. 6 is a top plan view of a bucket tackle system of FIG. 5. FIG. 7 is a side view of the bucket tackle system of FIG. 5, with the artificial lures being removed. FIG. 8 is a top plan view of the bucket tackle system, taken along the lines 8—8 of FIG. 7.

The bucket tackle system 110 includes a container or bucket 111 which has a generally cylindrical shape for holding a five-gallon or six-gallon capacity. However, it should be understood that various other cross-sectional configurations, such as square, rectangle, oval, and the like may be used as well. The bucket 111 is formed by a circular planar closed bottom base 114 and a circumferential side wall 116 which extends upwardly from the bottom base 114 and terminates in an open end 118 defining a lip portion. The side wall 116 of the bucket is also preferably provided with a bail 120 which has a handle 122. The ends of the bail 120 are mounted adjacent to the top of the side wall 116 of the bucket 111 so as to allow rotation of the handle 122.

The bucket tackle system 110 has the same shape and dimensions as the bucket 12 illustrated in FIGS. 1–4. Similarly, the bucket 111 may be formed of any suitable material, such as plastic, wood, fiberglass, metal and the like as desired by a user. Preferably, the bucket 111 is generally molded of a one-piece construction of plastic material having a thickness of about one-eighth of an inch so as to provide sufficient strength and durability.

The lip portion 118 of the bucket tackle system 110 is formed with a plurality of U-shaped slots 124. Each of the slots 124 is spaced apart from each other about one and one-half inches. The height dimension of the slots is approximately one inch and the width thereof is about one-fourth inch. The bucket 111 is formed with an outer circumferential ledge portion 126 disposed slightly below the lip portion 118. A plurality of small holes 128 is formed in the ledge portion 126. Each of the plurality of artificial lures 112 includes a hook 130 having a tip 132. The hooks of the artificial lures 112 are insertable between the slots 124 and the tips 132 thereof are received in the associated holes 128 so as to allow the lures to be secured and hanging down from the inside wall of the bucket, without thus being mixed up or tangled together. As a result, the plurality of lures 112 can all be seen at once and the specific lure desired for use can be easily selected and picked up.

The bucket tackle system 110 includes a container or tray 134 which has a size and shape so as to fit on the inside of the side wall 116 and the bottom base 114 of the bucket 111. The tray 134 is relatively shallow and substantially circular in shape and is preferably made of any suitable material, such as plastic or the like. A plurality of divider walls 136 is used to subdivide the tray 134 into three compartments 138a, 138b and 138c. The larger compartment 138a serves to accommodate somewhat larger size fishing accessories, such as extra weights, pliers, scalers, jigging lures, and the like. The two smaller compartments 138b and 138c serve to hold various small items of tackle, such as hooks, sinkers, plugs spools and the like therein. A relatively short, centrally disposed handle member 140 is formed in the central area of the tray. The handle is used to facilitate the insertion and removal of the tray into and out of the tray.

The bucket tackle system 110 further includes a solid, cylindrically-shaped cover or lid 142 which is preferably made of plastic or other suitable materials. The cover 142 is provided with a downwardly-extending flange 144 which is positioned over the lip portion 118 of the bucket 111 so as to close the same, thereby securing therein the artificial lures and other items of tackle. Furthermore, the cover 142 may be used as a seat by the fisherman.

In FIG. 9, there is shown a perspective view of a third embodiment of a bucket tackle system 210 of the present invention, which is quite similar to the second embodiment of FIGS. 5–8. FIG. 10 is a top plan view of a bucket tackle system of FIG. 9. FIG. 11 is a side view of the bucket tackle system of FIG. 9, with the artificial lures being removed. FIG. 12 is a top plan view of the bucket tackle system, taken along the lines 12—12 of FIG. 11.

The bucket tackle system 210 includes a container or bucket 211 which has a generally cylindrical shape for holding a five-gallon or six-gallon capacity. However, it should be understood that various other cross-sectional configurations, such as square, rectangle, oval, and the like may be used as well. The bucket 211 is formed by a circular planar closed bottom base 214 and a circumferential side wall 216 which extends upwardly from the bottom base 214 and terminates in an open end 218 defining a lip portion.

The lip portion 218 of the bucket tackle system 210 is formed with a plurality of U-shaped slots 224. The bucket 211 is formed with an outer circumferential ledge portion 226 disposed slightly below the lip portion 218. A plurality of small holes 228 is formed in the ledge portion 226. Each of the plurality of artificial lures 212 includes a hook 230 having a tip 232. The hooks of the artificial lures 212 are insertable between the slots 224 and the tips 232 thereof are received in the associated holes 228 so as to allow the lures to be secured and hanging down from the inside wall of the bucket.

The bucket tackle system 210 includes a container or tray 234 which has a size and shape so as to fit on the inside of the side wall 216 and the bottom base 214 of the bucket 211. The tray 234 is relatively shallow and substantially circular in shape and is preferably made of any suitable material, such as plastic or the like. A plurality of divider walls 236 is used to subdivide the tray 234 into three compartments 238a, 238b and 238c. A relatively short, centrally disposed handle member 240 is formed in the central area of the tray.

The bucket tackle system 210 further includes a solid, cylindrically-shaped cover or lid 242 which is preferably made of plastic or other suitable materials. The cover 242 is provided with a downwardly-extending flange 244 which is positioned over the lip portion 218 of the bucket 211 so as to close the same, thereby securing therein the artificial lures and other items of tackle. Furthermore, the cover 242 may be used as a seat by the fisherman.

In addition, the bucket tackle system 210 includes a plurality of accessories holders 246 which are fixedly mounted adjacent to the outside surface of the side wall 216 of the bucket 211 by any suitable means such as welding or riveting or the like. The accessories holders 246 are used to hold various large or lengthy fishing accessories on the exterior of the bucket 211, which includes, but is not limited to, pliers, fillet knives, jigging lures, trolling weights, scalers and the like. Each of the holders consists of a hollow tubular member having a length of about ten inches and a diameter of about one and one-half inches. Any number of accessories holders 246 may be mounted on the outer side wall of the bucket, such as ten or twelve. On the other hand, a plurality of holders may be mounted all around the outer side wall. The holder may be formed of any suitable material, such as plastic, wood fiberglass, metal and the like. The holders are preferably made of a PVC material.

From the foregoing detailed description, it can thus be seen that the present invention provides a bucket tackle system which includes a bucket, a fishing rod and reel insert assembly disposed inside of the bucket, and a cover secured to the open end of the bucket for organizing, transporting and storing fishing rods and reels. As a result, they are prevented from being damaged and/or destroyed.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A bucket tackle system for organizing, transporting and storing of fishing rods and reels, said bucket tackle system comprising:

a bucket having a closed bottom base and a cylindrical side wall extending upwardly from said closed bottom base and terminating in an open end;

a fishing rod and reel holder insert assembly including a flat disc portion, a plurality of end cap members fixedly secured to said disc portion, and a plurality of hollow tubular members having a first end and a second end;

the first end of each of said plurality of tubular members being fixedly secured to a corresponding one of said plurality of end cap members so as to be vertically extending therefrom;

the second end of each of said plurality of tubular members being formed with opposed first and second slots adapted for holding handle portions of the fishing rods and reels;

said opposed first slot consisting of a U-shaped cut-out having a width of about one inch and a height of about two and one-fourth inches; and a cover having a plurality of openings, said openings being aligned with the first ends of said plurality of tubular members so that said cover is slidable down over the tubular members and is engageable with the open end of the bucket, whereby the handle portions of the fishing rods and reels are insertable into corresponding ones of the plurality of tubular members and are supported and maintained in a vertical position adjacent to each other.

2. A bucket tackle system as claimed in claim 1, wherein said bucket has a cylindrical shape for holding a five-gallon capacity.

3. A bucket tackle system as claimed in claim 1, wherein said bucket is molded of a one-piece construction of plastic material.

4. A bucket tackle system as claimed in claim 1, wherein said plurality of end cap members and said plurality of tubular members are made of a plastic material.

5. A bucket tackle system as claimed in claim 1, wherein said plurality of end cap members and said plurality of tubular members are made of a polyvinyl chloride material.

6. A bucket tackle system as claimed in claim 1, wherein said cover is made of a plastic material.

7. A bucket tackle system as claimed in claim 1, wherein said each of said plurality of tubular members has a length of about twenty inches and a diameter of about one and one-half inches.

8. A bucket tackle system as claimed in claim 1, wherein said opposed second slot consists of a U-shaped cut-out having a width of about one inch and a height of about one inch.

* * * * *